United States Patent
Harkins et al.

(10) Patent No.: US 7,342,502 B2
(45) Date of Patent: Mar. 11, 2008

(54) WIRELESS SHORT RANGE COMMUNICATION SYSTEM

(75) Inventors: Donald Harkins, Eugene, OR (US); Chad Minter, Coburg, OR (US); Benton Ulm, Coburg, OR (US)

(73) Assignee: Consort, LLC, Eugene, OR (US)

( * ) Notice: Subject to any disclaimer, the term of this patent is extended or adjusted under 35 U.S.C. 154(b) by 321 days.

(21) Appl. No.: 11/155,128

(22) Filed: Jun. 16, 2005

(65) Prior Publication Data
US 2006/0286933 A1 Dec. 21, 2006

(51) Int. Cl.
*G08B 23/00* (2006.01)

(52) U.S. Cl. .................. 340/573.1; 455/41.2; 455/90.1; 340/692

(58) Field of Classification Search ............. 340/573.1, 340/539.1, 539.11, 539.26, 693.5, 692; 128/200.24; 455/90.1–90.3, 569.1, 41.2
See application file for complete search history.

(56) References Cited

U.S. PATENT DOCUMENTS

| | | | |
|---|---|---|---|
| 3,069,511 A | 12/1962 | Gibson et al. | |
| 3,908,168 A | 9/1975 | McMahon | |
| 4,072,831 A | 2/1978 | Joscelyn | |
| 4,491,699 A * | 1/1985 | Walker | 455/90.1 |
| 4,508,936 A | 4/1985 | Ingalls | |
| 4,885,796 A | 12/1989 | Loftus et al. | |
| 4,980,926 A | 12/1990 | Noetzel | |
| 5,404,577 A * | 4/1995 | Zuckerman et al. | 455/66.1 |
| 5,566,362 A | 10/1996 | Bauer et al. | |
| 5,990,793 A | 11/1999 | Bieback | |
| 6,121,881 A | 9/2000 | Bieback et al. | |
| 6,285,757 B1 | 9/2001 | Carroll et al. | |
| 6,382,206 B1 | 5/2002 | Palazzotto et al. | |
| 6,559,620 B2 | 5/2003 | Zhou et al. | |
| 6,720,878 B2 | 4/2004 | Jumpertz | |
| 2004/0131498 A1* | 7/2004 | Kuutti | 422/58 |
| 2005/0096096 A1* | 5/2005 | Birli et al. | 455/569.1 |
| 2005/0172959 A1* | 8/2005 | Williams | 128/201.19 |

OTHER PUBLICATIONS

Daniel Ceperley et al., LifeLine: Improved Communication and informatics . . . ; Computer Society Int'l. Design Competition; May 2002.
Talk-Around Specification Card, Questions & Answers, Product Highlights, Scott Technologies Company, Circa 2001.

\* cited by examiner

*Primary Examiner*—Thomas Mullen
(74) *Attorney, Agent, or Firm*—Hancock Hughey LLP

(57) ABSTRACT

A wireless communications system defining an wireless personal area network enables reliable communications between members of workers in a group wearing compatible systems. Each member of a group is fitted with a communications system having a microphone, a transceiver and a speaker.

32 Claims, 4 Drawing Sheets

WIRELESS SHORT RANGE COMMUNICATION SYSTEM

TECHNICAL FIELD OF THE INVENTION

This invention relates to a wireless short range communication system that enables reliable communications between and among members of a group wearing compatible systems.

BACKGROUND OF THE INVENTION

Effective and reliable communications between and among team members working in a hostile environment are critical components of safe and effective operations. Whether the team members are firefighters, police, military or other workers whose jobs requires performance in dangerous situations, all such workers benefit when they are able to rely on reliable communications systems. The performance and efficiency of the team also is improved when team members are in full communication.

Individuals working in hostile or dangerous environments, particularly in situations where there is an immediate danger to life or health, generally wear some kind of protective gear. In the case of firefighters, the protective gear often includes full or partial face masks that assist with breathing in smoke or gas-filled environments. While there are many known types of face masks, a typical mask includes a cup-shaped main body that is made of a pliable, air impermeable material, such as rubber. The main body is coupled to a source of fresh air, oxygen-rich breathing mixture, or mechanical filtration mechanism to scrub the harmful environmental air of toxins such as poisonous gas. The mask is placed over the fireman's face and mouth before entering a dangerous environment.

While the mask provides a necessary measure of safety for the fireman, since it covers the individual's face and mouth, it typically causes diminished or disturbed communication between individual wearers of such masks. As individuals who wear such safety equipment know, face masks often diminish communication to the point where communication between the users is not possible. This is especially true in difficult environments, such as burning structures, where such masks must be worn. The mask seal, while acting to block out infiltration of harmful gas, also invariably suppresses voice communication. Even in a quiet environment, an individual speaking while wearing a full face mask cannot be heard clearly by someone else standing near by. Moreover, the environment where these masks are used is typically an environment with the sound of mechanical apparatus, people shouting, weapons being fired, fire hose streams hitting walls and other loud sounds.

Ironically, while a face mask is a mandatory part of safety equipment, it at the same time may diminish worker safety by inhibiting communication among workers.

Various communications systems have been devised to overcome the difficulties just noted. One type of system incorporates a microphone on the interior of the face mask. However, an electrical connector such as a wire penetrates the body of the mask through a small opening. Even if these openings can be sealed adequately when the mask is new, they often leak as the mask ages or wears with use.

Another well known prior art communication device includes a microphone that attaches to a speaker mounted on the body or attaches to long range radios such as radios operating on a VHF frequency. While both have their uses, the primary need of persons wearing full face masks is communication with other team members also wearing full face masks in the immediate vicinity.

There is a substantial need, therefore, for improved systems and apparatus that allow for reliable communications between such team members.

The present invention is a short range, wireless communications system that provides for reliable and effective communications between team-members in a working group, avoiding use of long range broadcast frequencies and thus alleviating radio traffic on those frequencies that are needed by other workers.

BRIEF DESCRIPTION OF THE DRAWINGS

The invention will be better understood and its numerous objects and advantages will be apparent by reference to the following detailed description of the invention when taken in conjunction with the following drawings.

DETAILED DESCRIPTION OF ILLUSTRATED EMBODIMENTS

The invention is described and illustrated herein as it may be embodied in a face mask, face shield, and helmet of the type that typically is worn by firefighters and other emergency workers engaged in similar activities in dangerous environments. It will be readily appreciated that the invention is not limited to use by firefighters and the equipment they use, but is useful and applicable in any situation where short range communications between team members facilitates safety and effective work conditions. By way of example and not limitation, the communications apparatus and methods described herein may be used by SWAT team members, hazmat workers, and maintenance workers whose jobs require entry into dangerous environments such as enclosed tanks and the like.

Short range broadcast communications among members of a team—that is, having communication only with those members in the immediate vicinity, facilitated by a communications system according to the present invention, offer a number of advantages over other forms of inter-team broadcast communications.

For example, short range communication facilitates working conversation without interfering with radio traffic on long range communication channels. Small working gmups of 7 or less can share a common short range communication channel in the vicinity while another small working group can share a different communication channel. In many emergency situations there are personnel whose jobs require continued use of long range radio frequencies such as VHF channels. On the other hand, other worker's jobs not only do not require access to long range channels, but continuous "chatter" on long range frequencies interrupts and interferes with these worker's jobs. As an illustration of this principale, a small group of firefighters who enter a burning building must be able to communicate with one another. However, fire command teams and others outside of the building must be able to communicate on long range frequencies. Use of long range frequencies by the individuals in the building impairs outside communications by the command teams, and likewise, communication by the command team interferes with effective inter-team communication between those in the building.

Short range communication also aids in keeping track of, and locating lost team members. Rapid Intervention Team (RIT) standards for firefighters require that a minimum of two firefighters stand by outside a building in full protective equipment, while other crew members are working in a hazardous atmosphere. If a firefighter becomes lost, trapped or disoriented while fighting a structure fire, the RIT team can determine an approximate vicinity of the fallen firefighter by walking outside the structure and determining where the signal is gained or lost. If the structure is large, the RIT team can identify their proximity to the lost team member within about ten meters, which is the maximum ideal distance of the short range communication device. Other advantages of short range inter-team communications are detailed herein.

Figure 1:
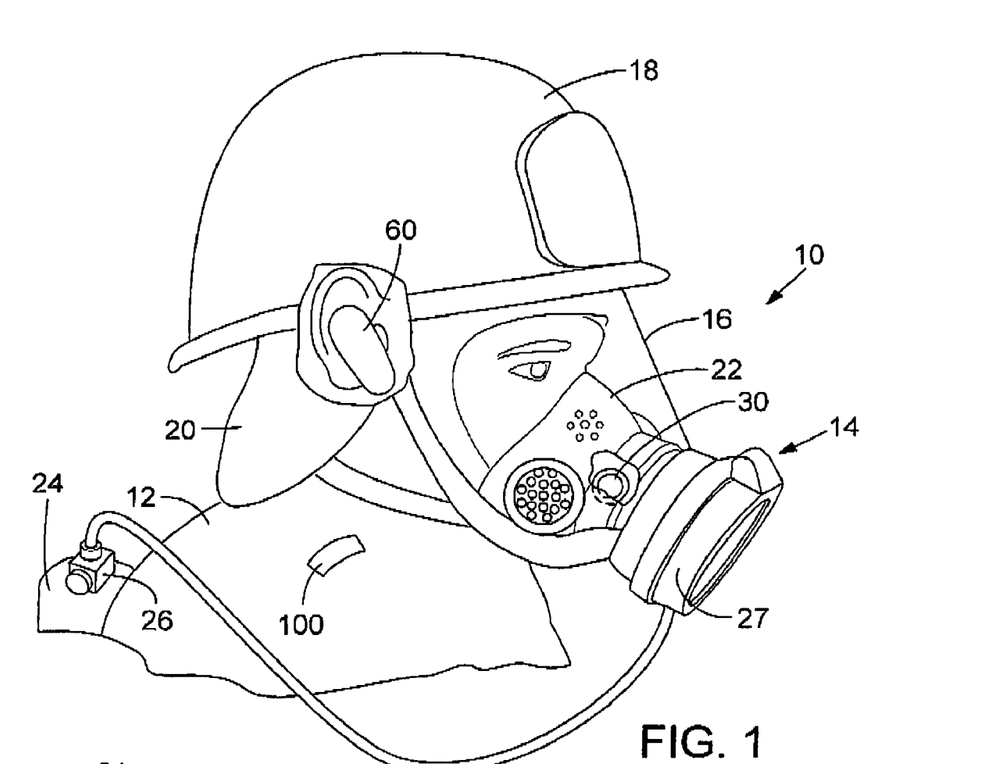
FIG. 1 is a side view of an emergency worker such as a fireman wearing a face mask and helmet in which a communications system according to the present invention is incorporated—the face mask and helmet are shown in partial cut-away view to illustrate the components of the invention.

Turning now to the drawings, and with specific reference to FIG. 1, a communications system 10 is illustrated in one embodiment worn by a firefighter 12. As detailed herein, there are many different combinations of emergency equipment with which the communications system 10 may be used. Nonetheless, for purposes of illustration, the firefighter 12 is shown wearing a face mask 14, a face shield 16, a helmet 18 and a heat shield 20 that is incorporated into the helmet. In many instances, the face shield 16 is designed to provide an air-tight, gas-impermeable seal around the firefighter's face.

The face mask 14 illustrated herein is a conventional SCBA device that includes a pliable main body 22 that covers the firefighter's mouth and nose. The main body 22 is attached to a supply of air 24, typically a tank worn on the firefighter's back, with an appropriate high pressure regulator 26 and face mask 14 includes a low pressure regulator 27. Typically, the high pressure regulator 26 and low pressure regulator 27 are designed to maintain a positive air pressure within the mask so that the firefighter 12 has a continuous supply of fresh air. It will be appreciated that the communications device 10 described herein may be used with any face mask, including canister or filter type masks that are not attached to an independent air source.

The communication system 10 includes a microphone 30 that as described below is a wireless, voice activated and short range microphone, and a transceiver 60, which in the embodiment shown in FIG. 1 is embodied as an earphone-type device worn attached to the ear of firefighter 12. As described below, the communications system 10 also may include optional sensors worn by firefighter 12, such as sensor 100. Each component will be described separately.

Microphone 30 is, in the illustrated embodiment, a voice activated, wireless microphone that utilizes active noise cancellation protocols. It is at times referred to herein as transmitter 30. Alternately, microphone 30 may be of the type that is remotely activated—although wirelessly—by the firefighter depressing a "talk" button.

As shown in FIG. 1, microphone 30 is housed entirely within the interior of main body 22 of face mask 14. Because the microphone is a wireless device, there are no wires or other communications devices that penetrate the body of face mask 14 that could compromise the integrity of the gas-tight seal between the mask and the user's face.

Figure 2:
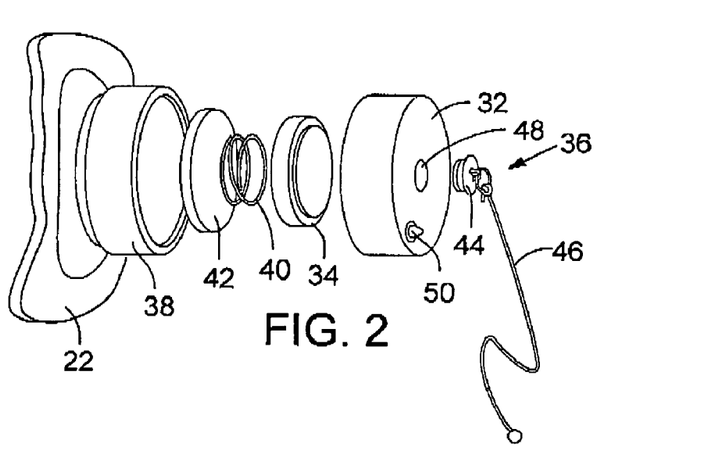
FIG. 2 is an exploded view of a microphone according to the present invention.

Microphone 30 is small enough so that it is held in proximity to the mouth of firefighter 12, but does not interfere with the firefighter's normal activity or speaking. The microphone may be mounted in any appropriate position within the interior of the face mask. With reference to FIG. 2, microphone 30 is shown in an exploded view to detail its components, which include the microphone 32, a power supply 34 such as a battery, and an activation switch 36. Microphone 30 and battery 34 are received and mounted in a mounting housing 38, which is attached to the interior surface of main body 22 of the face mask 14. Housing 38 is sized to receive microphone 30 and battery 34, and also a biasing member such as a spring 40 that is interposed between the battery 34 and a base plate 42. Housing 38 preferably is a pliable material that allows easy insertion and removal of microphone 30 and its component parts from the housing, for instance, when it is necessary to replace battery 34. The housing 38 may be attached to the interior surface of main body 22 by any convenient method, such as adhesives, hook and loop fabric fasteners, etc., so that the communications system 10 may be added to or retrofitted in existing face masks. Likewise, the communications system may be added to new equipment.

Activation switch 36 comprises a removable plug 44 that has a lanyard 46 attached to it. The plug 44 is sized to be inserted into an opening 48 formed in microphone 30. When plug 44 is inserted into opening 48, the electrical circuit that powers microphone 30 is open. That is, the microphone is off or inactivated. When plug 44 is removed from opening 48 the electrical circuit is closed, thereby activating the microphone. The plug 44 may be used to activate a variety of different switch types, including for example a mechanical switch, an electronic switch or an electromagnetic switch. An indicator light 50 such a light emitting diode illuminates when the circuit is closed to indicate that the microphone 30 is activated, or switched on. When plug 44 is inserted into opening 48, the plug acts as a barrier to entry of foreign substances, dirt and the like, so the plug therefore helps to keep the opening clean.

Lanyard 46 is sized long enough that it extends beyond the outer limits of the face mask. In other words, whenever the face mask 14 is worn by a firefighter, the lanyard 46, unless removed, interferes with the seal between the face mask and the firefighter's face, or must be manually tucked into the face mask. Accordingly, the lanyard acts not only as a convenient and simple way to activate the microphone 30 by pulling on and thus removing plug 44, but also serves to remind the firefighter to turn the microphone on whenever the face mask is being used. This prevents the situation where the firefighter inadvertently forgets to turn on the microphone.

As noted, microphone 30 is in a preferred embodiment a voice activated, wireless transmitter that converts voice communication using digital signal processing into a digital signal that is transmitted to one or more other wireless short range frequency transceivers that are worn by individuals in a working group. Preferably, microphone 30 is suitable for operation in the ISM (Industry Scientific and Medical) band, which is the unregulated frequency band beginning at 2.402 GHz and ending at 2.483 GHz in the U.S. and Europe. The ISM band defines 79 RF channels, each of 1 MHz width. The Bluetooth protocol is an example of such an ISM band operation for a "Wireless Personal Area Network" (WPAN), as is the IEEE 8.02.11 standard. For purposes herein, a WPAN may be considered to be an area defined as the working area for a team of workers where proximal devices may share information and resources such as communications between devices in the WPAN. For the Bluetooth protocol, the WPAN is the short range area from zero to about ten meters.

Referring once again to FIG. 1, firefighter 12 wears a transceiver 60 positioned near his ear. Transceiver 60 may take different forms, and as described below, may be positioned at other locations. Nonetheless, in the embodiment illustrated in FIG. 1, transceiver 60 is shown as an earphone type device that is worn on the ear. Transceiver 60 incorporates a speaker 61 so that communications may be heard by firefighter 12, and communications electronics that cooperate with microphone 30 to clarify voice communications and remove or cancel ambient noise. As with the microphone 30, transceiver 60 is operable in the ISM band, preferably using the Bluetooth protocol or other appropriate protocol for WPAN communications.

Figure 5:
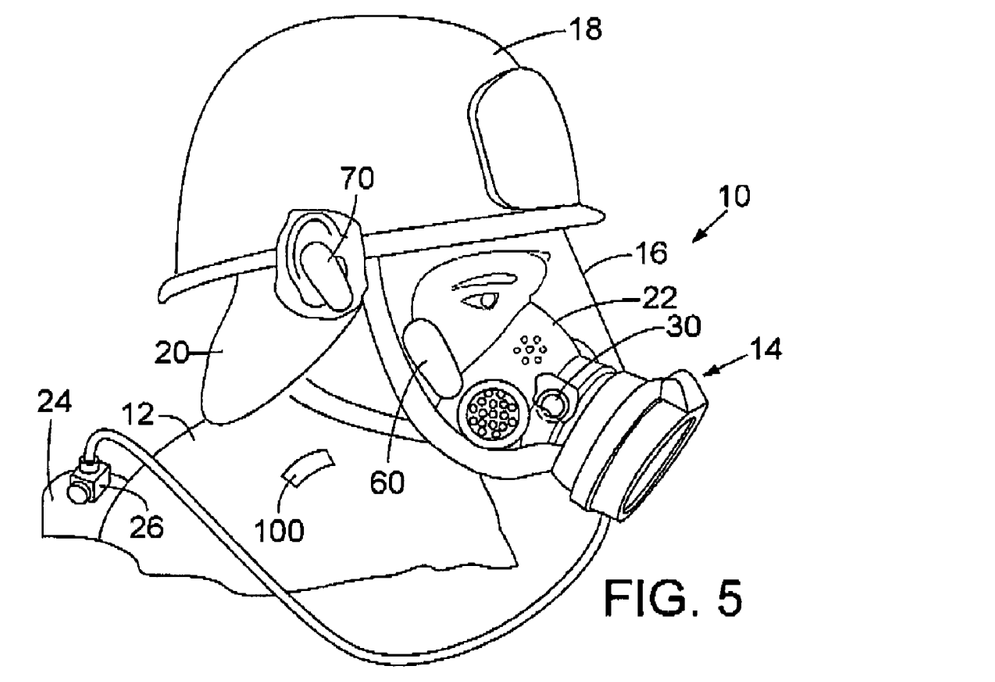
FIG. 5 is an illustrated alternative embodiment showing one alternative manner in which the communications system shown in FIG. 1 may be incorporated into a firefighter's equipment.
Figure 6:
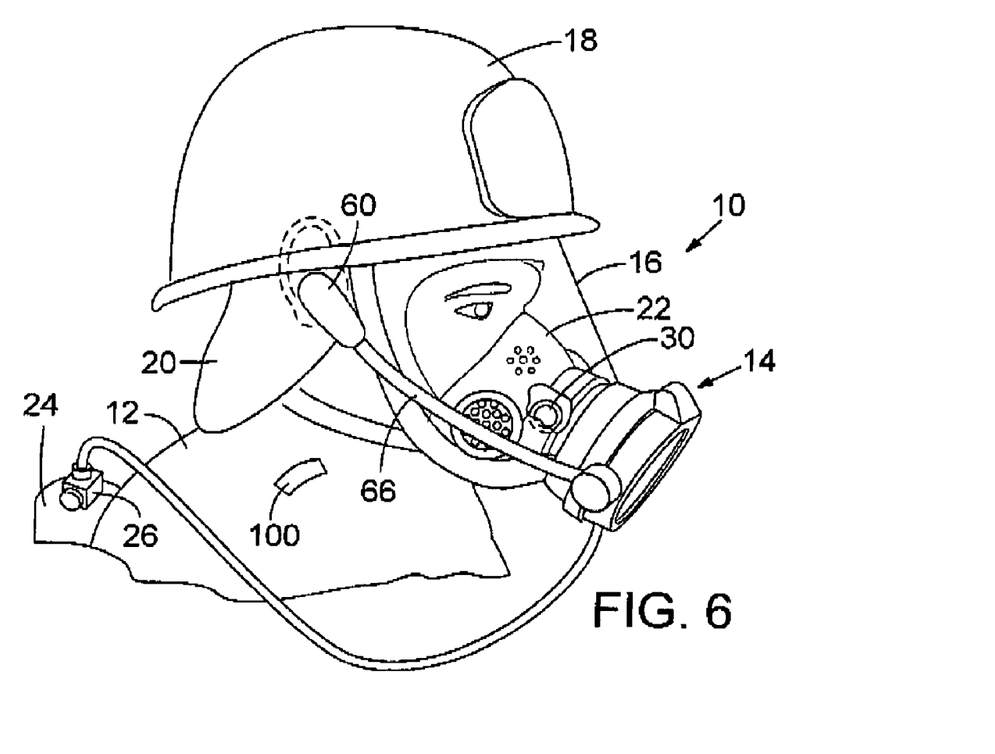
FIG. 6 is yet another illustrated alternative embodiment showing one additional alternative manner in which the communications system shown in FIG. 1 may be incorporated into a firefighter's equipment.

FIGS. 5 and 6 show other illustrated embodiments in which the transceiver 60 is located in other positions, with the same results as the embodiment shown in FIG. 1. In FIG. 5 the transceiver 60 is physically separated from the speaker. Thus, transceiver 60 is mounted to the outer surface of firefighter 12's face shield 16. In this case, a speaker module 70 housing a speaker may be positioned by the user's ear in an earphone-type enclosure. Likewise, the speaker may be mounted to a housing that attaches to the user's helmet, heat shield, or other protective headgear. In FIG. 6 the transceiver 60 is mounted to a boom 66 that is rotatably mounted to face mask 14 so that the boom 66 may be positioned such that the transceiver and its enclosed speaker is positioned near the user's ear. In either case, the transceiver and the speaker modules include adequate power sources and electronics. The foregoing demonstrates two of the many different and equivalent structures for mounting the transceiver and speaker, either alone or together.

Figure 3:
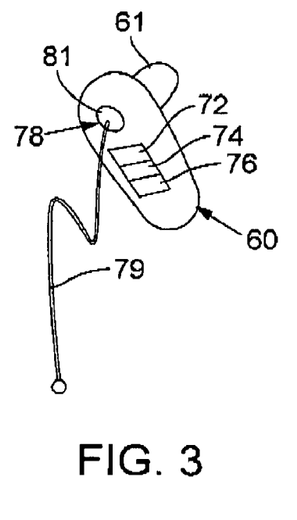
FIG. 3 is a schematic view of a transceiver according to the present invention.

Regardless of how the transceiver 60 is mounted, as shown in FIG. 3, the transceiver preferably incorporates a speaker 61 that may be positioned in operational proximity to the user's ear, a receiver 72, a short range transmitter or microphone 74, a power supply 76 and an on I off switch 78. In the illustrated embodiment, on/off switch 76 is a switch of the same type described above with reference to the plug 44 that acts as the switch for microphone 30. Thus, a lanyard 79 is attached to a plug 81 that is inserted into an opening in the transceiver. The plug 81 operates in the same way that plug 44 operates: when the plug is removed by pulling lanyard 79, the electrical circuit that powers transceiver 60 is closed so that the transceiver is powered on. Preferably, plug 44 and plug 81 are of the same size and configuration so that they are thus interchangeable. The receiver 72 is configured for receiving digital signals from other transmitters in the WPAN. As with the microphone 30, the transmitter 74 in transceiver 60 is a wireless transmitter that converts voice communication using digital signal processing into a digital signal that is transmitted to one or more other wireless short range frequency transceivers that are worn by individuals in a working group. It will be appreciated that In transceiver 60, the transmitter 74 and receiver 72 may be a common, multifunctional apparatus. The power supply 76 is preferably a replaceable battery, and the on/off switch 78 may, in addition to the plug and lanyard switch described above, be a standard switch such as a push-button switch, preferably with a status indicator light.

In one embodiment, communications system 10 incorporates noise cancellation protocols in the internal electronics in order to clarify spoken communications and minimize ambient environmental noise. As noted above, personnel using communications systems 10 often work in difficult and noisy conditions. Moreover, respiration equipment itself creates noise as compressed air rushes through the regulator into the face mask when a breath is drawn. Regulator noise is usually louder than the spoken word, and as such, simple voice activation switches may be ineffective. Signal processing can alleviate environmental noise such as the noise from a respirator through volume level cancellation. Relative thresholding of the sound received by the microphone within the mask can cancel the respirator noise. Removal of the respirator noise can also occur through signal processing the frequency of the sound of the respirator.

More specifically, prior to transmitting the digital signals representing voice communications, the signal is processed to clarify the voice and remove ambient noise. The ambient noise cancellation preferably incorporates a secondary microphone such as microphone 74 located outside the face mask 14, which is the originating point for the noise or sound that is to be cancelled. In one preferred embodiment, the secondary microphone 74 is located on transceiver 60, which thus acts as a receiver of digitized voices from other transmitters in the wireless network. Noise cancellation may be accomplished according to any one of several protocols. In a first embodiment, the noise cancellation is accomplished with electronics carried in the housing for transceiver 60. In this system, signals from microphone 30 are transmitted to transceiver 60 and are processed to cancel ambient noise in the microphone carried in transceiver 60.

Alternately, transceiver 60 may be configured as a transmitter that will transmit the ambient noise signal to the microphone 30 located within the mask. The signal processing masks the environmental noise with the voice signal to cancel the external ambient sounds. The signal processing will determine the origin of the sound, whether it is internal or external to the mask by a volume comparison. Those sounds where the volume is louder from the microphone at the transceiver 60 than the microphone 30 within the face mask 14 are by definition ambient noise due to the shielding effect that the facemask has to external sounds. Those sounds where the volume is louder from the microphone 30 in the face mask 14 than the sounds transmitted from the transceiver 60 are sounds that are to be broadcasted.

Signal processing may also be used to perform noise cancellation. For example, the transceiver 60 may include circuitry that enables cancellation of noise in a predetermined frequency band that corresponds to an expected noise—such as the frequencies that are typical of the sound of air rushing into the face mask 14.

Transceiver 60 preferably includes switching circuitry responsive to microphone 30 so that when the receiver 72 in transceiver 60 is not detecting signals corresponding to a user's voice transmitted from microphone 30, the transceiver 60 is in receiving mode. In this receiving mode, transceiver 60 is capable of receiving voice communications from microphones worn by other firefighters in the working group. When receiver 72 in transceiver 60 detects a signal from microphone 30 worn by firefighter 12, the signal thus corresponding to the user's voice, the transceiver switching circuitry switches the transceiver to a second, transmitting mode. In this transmitting mode, the secondary microphone 74 broadcasts the signals to the receivers 72 in other transceivers 60 worn by others in the working group. The voice communications from firefighter 12 are thus broadcast to other members of the group.

Figure 4:
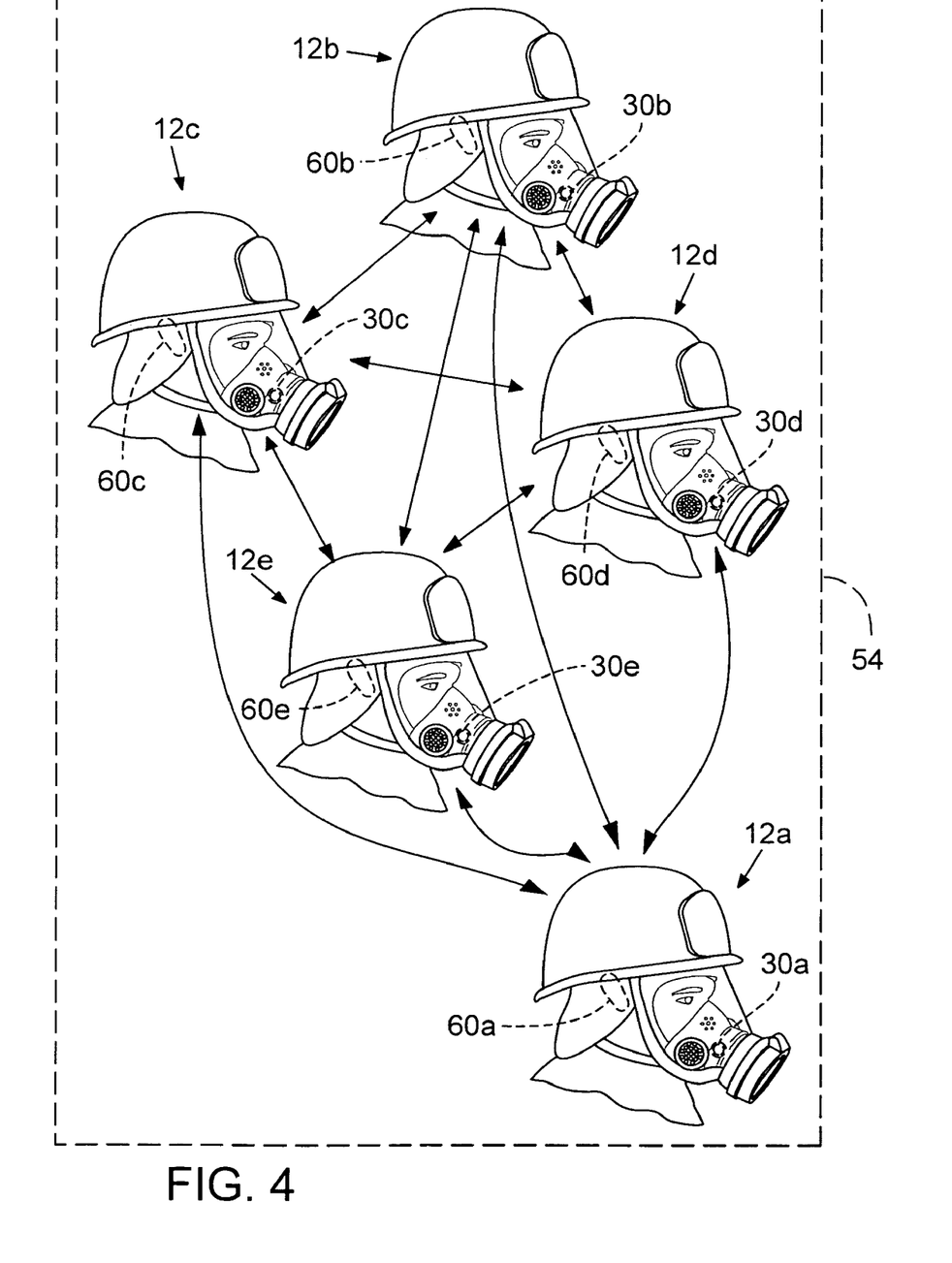
FIG. 4 is diagrammatic view of a communications system according to the present invention to illustrate the communications between members of a team who are wearing such systems.

Turning now to FIG. 4, a group of firefighters with reference number 12a, 12b, 12c, 12d and 12e are shown schematically in a diagram that represents a working group of firefighters, each wearing a communications system 10 according to the present invention In a WPAN, labeled as 54. Each firefighter 12 In the group is wearing a communications system 10 according to the present invention, including a microphone 30 and a transceiver 60. in FIG. 4 structures that are common to the figures already described are numbered in a like fashion, such as transceivers 60a, 60b, and so on. Furthermore, for purposes of explaining the communications system 10 in FIG. 4 its will be assumed that the WPAN is operating in a Bluetooth communications protocol.

As noted above, and briefly described, Bluetooth operates in the ISM frequency band from 2.402 GHz to 2.483 GHz, providing 79 RF channels of 1 MHz width. Two or more units communicating on the same channel in a Bluetooth WPAN form a piconet, where one unit operates as a master and the others in the piconet operate as slaves. A piconet is an ad hoc network created when two or more Bluetooth-enabled devices recognize one another and communicate. There is a maximum of seven active units in a piconet at any one time. Slaves in the piconet synchronize their timing and frequency hopping to the master upon establishment of a connection.

In the illustration of FIG. 4, each transceiver 60a through 60e participates in the WPAN as a master node in each individual firefighter's individual piconet—that is, the piconet established between the firefighter's transceiver 60 and the same firefighter's microphone 30. With specific reference to firefighter 12a in FIG. 4, that firefighter's master node may have up to 6 slave devices, such as firefighter's microphone 30a and the transceivers 60b, 60c, 60d and 60e worn by firefighters 12b, 12c, 12d and 12e, respectively. Inter-member communications are illustrated by the arrows extending between and among members of the work group.

Inter-piconet communication among members of a working team is accomplished by creating a scatternet, which may be defined as a group of independent, non-synchronized piconets that share at least one common Bluetooth-enabled device. This is accomplished by a transceiver 60 creating a bridge between two or more piconets. Bridges are master-slave such that the transceiver 60 in one piconet may be the slave of another piconet. Creating a primary master that maintains the piconet with the receiver, additional sensors, and one or more other transceivers as master-slave bridges establish the Bluetooth topology. These transceivers, acting as a slave to the primary master will also act as a sub-master to other transceivers as master-slave bridges. The Bluetooth specification allows for changing topology as members of a work group enter and leave the WPAN.

Figure 7:
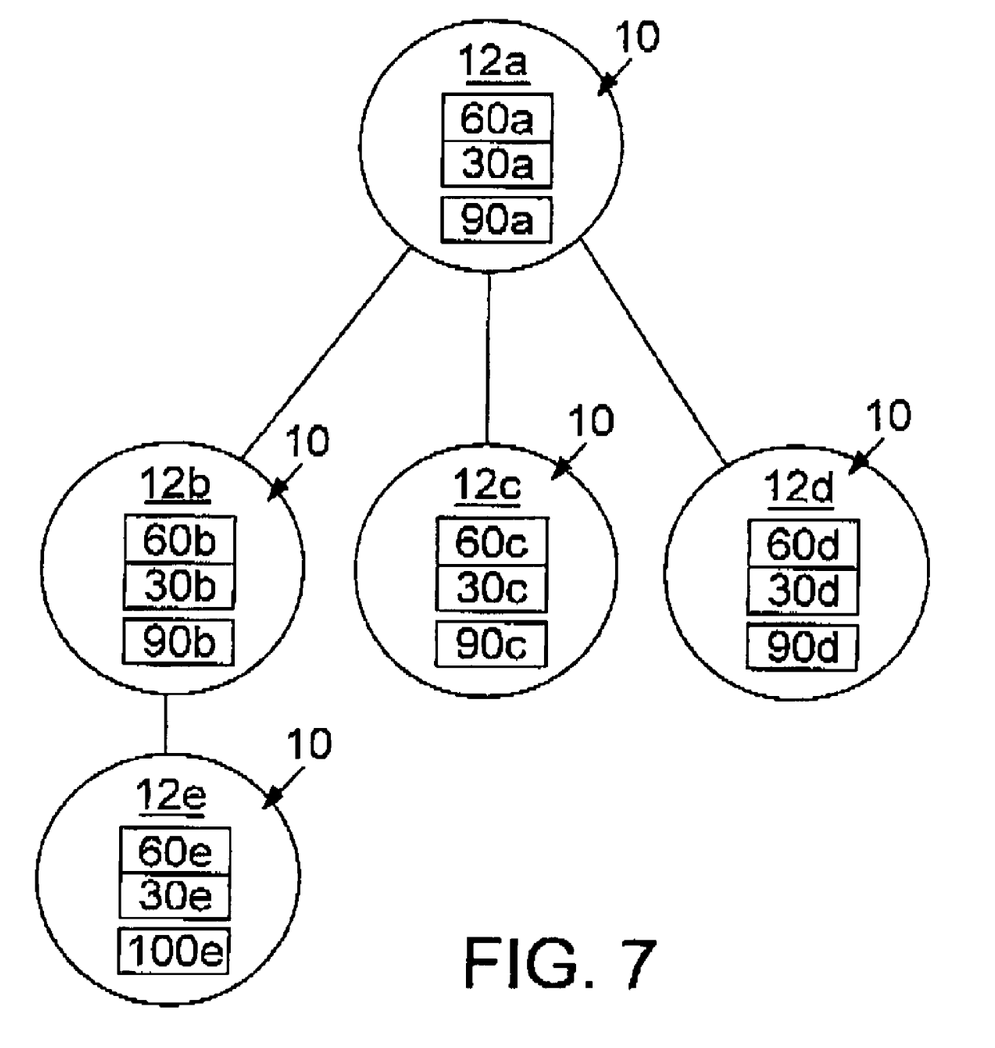
FIG. 7 is a schematic and diagrammatic illustration of one possible configuration of a group of workers in a working group, each of whom is wearing selected components of the communications system according to the present invention.

With reference to FIG. 7, a scattemet Is illustrated in schematic form. Each firefighter 12 (i.e., 12a, 12b, 12c, 12d, 12e) wears a communications system 10 comprising at least a microphone 30 and transceiver 60. As such, as detailed above, each firefighter 12 in the work group thus defines an Individual piconet between the transceiver 60 and microphone 30. Firefighter 12a is the primary master transceiver 60 in the scatternet, and there are five nodes in the piconet: one defined by the receiver in transceiver 60a, one defined by microphone 30a, and three bridge nodes to the three transceivers 60b, 60c and 60d (worn by firefighters 12b, 12c and 12d, respectively). Likewise, transceivers 60c and 60d have three nodes in their respective piconets. Transceiver 60b worn by firefighter 12b further is designated as a sub-master transceiver. It has four nodes in its piconet: one defined by the receiver in transceiver 60b, one defined by the microphone 30b, one defined by a VHF frequency adaptor 90b (detailed below) and one bridge node to transceiver 60e. Firefighter 12d is also shown as wearing a VHF frequency adaptor 90d, and firefighter 12e is shown wearing an environmental sensor 100e. VHF frequency adaptor 90 may be used in situations where it is necessary to relay communications from the short range system 10 described herein to the longer range VHF frequencies. VHF frequency adaptor 90 defines yet another communication device in communications system 10 that is within the WPAN. Adaptor 90 is configured to connect to VHF radio frequencies so that communications broadcast on VHF frequenciesfor example, by workers outside of the WPAN who are using VHF radios, are broadcast to workers within the WPAN. Nonetheless, the transmitters 30 worn by firefighters 12 located within the work group in the WPAN are configured to "talk over" transmissions received on the VHF adaptor 90. In this way, radio traffic on the VHF channels does not interfere with communications within the WPAN. Stated another way, adaptor 90 is not able to transmit VHF communications while there are communications ongoing within the WPAN.

Likewise, any communications by firefighters 12 within the WPAN remain only within the WPAN until a group member wearing a VHF adaptor 90, such as firefighter 12b, activates or "keys" the adaptor 90. At that time, any discussions amongst the group members in the WPAN are transmitted over the VHF radio to workers outside of the WPAN.

When one of the firefighters 12a through 12e enters the WPAN defined by the combined communication systems 10, the transceiver 60 worn by the entering firefighter joins the existing group as a slave to either the primary master 60a or to a sub-master (e.g., 60b). The transceiver entering the group then passes on information about the individual's piconet to all other members in the network, and the other members of the group pass information about the group to the new member.

If the individual that is established as the primary master of the scatternet (in the example of FIG. 7, firefighter 12a) departs from the group—that is, departs from the bounds of the WPAN, the first slave node with the smallest number of nodes within its piconet takes over as the primary master and the topology of the scatternet is adjusted accordingly.

As noted earlier, the communications systems 10 may be preprogrammed to broadcast information to members of a working group in a WPAN information about an individual. The information that is broadcast may take many different forms. For example, the information may be voice data defined by a prerecorded spoken voice, or synthesized voice. As an example of this type of information being broadcast, when other team members join a working group, all members may be alerted that the new member joining is within the WPAN. This is done by the transceiver 60 broadcasting an audible, spoken message comprising the member's pre-recorded voice announcing his or her name to all other team members, such as "Johnson joined." Likewise, when a team member has departed the WPAN boundaries, the team is alerted that a member has left the proximity by a pre-recorded broadcast transmitted from transceiver 60 such as "Johnson left." By using the team member's own pre-recorded voice as a broadcast message, other members of the group have an easier time in the identification of that team member since other team members will be more apt recognize the voice and associate it with the team member's name. Proper identification of team members is often important because failure to identify the team members may lead to dangerous assumptions about the experience or skills of the team members and the location of other members. The broadcast of the team member's own pre-recorded voice when joining a team aids in the identification of that team member, for when they speak again, other team members will recognize the voice and associate it with the team member's name. Similarly, the predetermined broadcast information may be a message such as "evacuate", or an audible beep or buzz to signal members of the group that one member's equipment needs maintenance, such as when the air supply is low.

In addition to the foregoing examples of where short range inter-team communications are beneficial, emergency response personnel wearing gas masks or SCBA have a need to know the status of their environment, the equipment in use, and other team members' health. Just as importantly, other team members also need to know the status of the user's environment, equipment status, and user's health. Sensors placed on the breathing apparatus can signal to the working team that one member is low on air or pending equipment malfunction. New standards require that firefighter masks have a heads-up display with lights to display the pressure level remaining in their air tanks. In a fire situation, firefighters often develop "tunnel vision" and ignore the lights displayed on their mask. Having an audible reminder transmitted by a short range communication system of the gas level in their tanks may increase the awareness of their remaining air in their tank, and hence their safety.

Similarly, an environmental sensor can provide valuable information to the emergency response personnel such as if the environment is safe to breathe, in that gases have dissipated to healthful levels so that the breathing apparatus is no longer required. Sensors placed on the emergency response personnel may also monitor the health of the user and be programmed to broadcast specific information to other members of the team, alerting other team members of a dangerous condition, for example if any members' vital signs are elevated or diminished to an unhealthy level.

Sensors can broadcast the information directly to the working team or broadcast data only to the wearable computing device/transceiver that in turn analyzes the sensor's data and broadcasts English or other language messages to the team when sensor data is out of the norm, such as, "Johnson low on air, 20% remaining."

The information that is generated by communications system 10 and passed between group members in this manner may be predetermined according to the particular situation and is referred to herein as member data. For example, member data information may include the member's name, his or her rank within the emergency services organization, the topology of the scatternet, and information about the sensors carried by each member's piconet. If one member of the group has a sensor for environmental temperature such as sensor 100*e* worn by firefighter 12*e*, member data information about that sensor is passed to other members of the team. In this way, all members of a team may share data output by environmental sensor 100*e*. This reduces the number of environmental sensors 100 that are required.

Sensors 100 placed on the emergency response personnel may also monitor the health of the user alerting other team members if any members' vital signs are elevated or diminished to an unhealthy level. Member data may thus further comprise health status information about individual members.

Sensors 100 preferably broadcast member data through a pre-recorded English or other spoken language message that is easily understood by the members of the working team. In tense emergency situations, it is better to use spoken language than number codes or a series of tones to communicate sensor information that is outside the normal parameters. Sensors 100 can broadcast the member data information directly to the working team or broadcast data only to the wearable computing device/transceiver that in turn analyzes the sensor's data and broadcasts spoken language messages to other group members information about the status of the sensor, such as out-of-norm conditions (e.g., "Johnson low on air, 20% remaining").

It will be appreciated from the foregoing description that various alternative embodiments may be made. As an example, the transmitter/microphone 30 may be placed outside of face mask 14 but within face shield 16. In this position the microphone is still able to pick up voice signals from the user, although the signals are not as strong given that the face shield naturally muffles the user's voice. However, in this case where microphone 30 is positioned externally to the face mask 14, the microphone may further act as a transceiver. As an example, a sensor such as sensor 100 may be located on or before the high pressure regulator and configured to transmit data about the pressure, or fullness, of the SCBA cylinder. The transceiver located within the mask may have 4 LED lights that illuminate to indicate the status of the amount of air remaining in the tank: four lit indicates full, three lit indicates ¾ full, two lit indicates ½ full, one lit indicates ¼ full, and one blinking indicates less than some predetermined amount, e.g., 500 psi, which is a commonly accepted danger point to change cylinders. In addition to LED light indicators as just explained, the data sent to the transceiver may be any type of data, and it may be displayed on any number of devices such as LCD displays, heads-up displays, laser writing, etc.

Current federal safety regulations stipulate that a firefighter must have an unobstructed view of how much air is in the SCBA cylinder. SCBAs manufactured under current standards are required to have a heads-up display that will display visual alert signals for breathing air cylinder content and for battery condition. The HUD as exemplified by the LEDs detailed above will display a visual alert signal for breathing air cylinder content when the breathing air in the SCBA cylinder has reduced to 50 percent of rated service content.

As yet another example of an alternative embodiment, a wireless transmitter may be positioned either outside of the face mask 14 but within face shield 16, or external to the face shield 16, with a microphone positioned in an operative location within the face mask. The communications system 10 according to the present invention may utilize a transmitter 30 located entirely within face mask 14 as shown in the drawings and as detailed above, or the transmitter may be located in other positions when coupled with a microphone operatively positioned to pick up the users spoken voice. The transmitter must in this manner be associated with the face mask so that the user's voice may be transmitted in the WPAN.

While the present invention has been described in terms of a preferred embodiment, it will be appreciated by one of ordinary skill that the spirit and scope of the invention is not limited to those embodiments, but extend to the various modifications and equivalents as defined in the appended claims.

We claim:

1. A short range communications apparatus for use with equipment including a face mask, comprising:
 a wireless transmitter operatively associated with the face mask;
 a transceiver capable of receiving signals from the transmitter and transmitting the received signals to other transceivers in a Wireless Personal Area Network (WPAN);
 a speaker associated with the transceiver so that signals broadcast from the transceiver may be audibly perceived;
 wherein said transceiver is operable in a first receiving mode when not receiving signals from the transmitter so that said transceiver may receive signals from other transceivers in the WPAN, and in a second transmitting mode when receiving signals from said transmitter so that said signals are broadcast to other transceivers in the WPAN.

2. The short range communications apparatus according to claim 1 wherein the transceiver switches between said first receiving mode when not receiving signals from the transmitter, and said second transmitting mode when receiving signals from the transmitter.

3. The short range communications apparatus according to claim 1 wherein the transceiver includes a manually activated switch for switching between said first receiving mode when not receiving signals from the transmitter, and said second transmitting mode when receiving signals from the transmitter.

4. The short range communications apparatus according to claim 1 including an activation switch on the transmitter, said activation switch including a lanyard attached to the switch.

5. The short range communications apparatus according to claim 4 wherein the lanyard extends beyond the periphery of the face mask.

6. The short range communications apparatus according to claim 1 wherein the transmitter is located entirely within the face mask.

7. The short range communications apparatus according to claim 1 wherein the transmitter is located externally of the face mask.

8. The short range communications apparatus according to claim 1 wherein the transceiver and the speaker are contained in a common housing configured to be worn by a user with the speaker in proximity to the user's ear.

9. The short range communications apparatus according to claim 8 wherein the common housing is attached to a boom connected to the face mask.

10. The short range communications apparatus according to claim 1 wherein the speaker is housed separate from the transceiver.

11. The short range communications apparatus according to claim 10 wherein the transceiver is attached to an external surface of said face mask.

12. The short range communications apparatus according to claim 1 further including a sensor configured for collecting data comprising predetermined criteria and for transmitting said data to transceivers in the WPAN.

13. The short range communications apparatus according to claim 12 wherein the transmitter associated with the face mask further defines the transceiver in the WPAN that is capable of receiving signals from the sensor and transmitting the received signals to other transceivers in the WPAN.

14. The short range communications apparatus according to claim 12 wherein the data signals transmitted from said sensor to said transceivers comprise voice signals.

15. The short range communications apparatus according to claim 12 wherein the data signals correspond to and are indicative of the status of equipment worn by a user.

16. The short range communications apparatus according to claim 12 wherein the data signals correspond to and are indicative of a predetermined health status of a user.

17. The short range communications apparatus according to claim 12 wherein the data signals correspond a predetermined environmental condition.

18. A method of facilitating short range communications among members of a working group where each member in the group is wearing emergency equipment including a face mask, comprising the steps of:
 (a) providing each member of the group with
   i) a wireless transmitter and locating the transmitter in a position relative to the member's mouth to enable the transmitter to detect the member's voice;
   ii) a transceiver capable of receiving signals from the transmitter and transmitting the received signals to other transceivers worn by members; and
   iii) a speaker associated with the transceiver so that signals broadcast from the transceiver may be audibly perceived;
 (b) transmitting signals from the wireless transmitter to all of the transceivers in the working group; and
 (c) switching each member's transceiver between a first receiving mode when not receiving signals from that member's transmitter so that said transceiver may receive signals from other transceivers in the working group, and a second transmitting mode when receiving signals from that member's transmitter so that said signals are broadcast to other transceivers in the working group.

19. The method according to claim 18 wherein the step of transmitting signals includes the step of canceling ambient noise in the environment.

20. The method according to claim 18 including the step of manually switching between said first receiving mode and said second transmitting mode.

21. A communications apparatus for use in a noisy environment, comprising:
 a face mask comprising a resilient material configured for providing an effective seal around a wearer's mouth and nose to define an interior space between the face mask and the wearer;
 a first wireless transmitter module associated with the face mask, said first transmitter module comprising a first microphone located entirely within the interior space;
 a second module located externally of said interior space, said second module comprising a second microphone in communication with the first transmitter module, and a second receiver, wherein said second microphone detects ambient noise and generates signals corresponding thereto.

22. The communications apparatus according to claim 21 in which the second receiver is operable to cancel said signals corresponding to ambient noise to thereby reduce ambient noise.

23. The communications apparatus according to claim 21 in which the first wireless transmitter module is operable to cancel said signals corresponding to ambient noise to thereby reduce ambient noise.

24. The communications apparatus according to claim 21 wherein said second module includes a speaker.

25. The communications apparatus according to claim 21 configured for wireless transmission between a second microphone in a first apparatus and a receiver in a second apparatus within a Wireless Personal Area Network.

26. The communications apparatus according to claim 21 wherein said second module is operable in a first receiving mode when not receiving signals from the first microphone so that said second module may receive signals from other transmitters in a working group, and in a second transmitting mode when receiving signals from said first microphone so that said signals are broadcast to other transceivers in the working group.

27. The communications apparatus according to claim 26 wherein the second module switches between said first receiving mode when not receiving signals from the first microphone, and said second transmitting mode when receiving signals from the first microphone.

28. The communications apparatus according to claim 21 including an activation switch on the first microphone, said activation switch including a lanyard attached to the switch that extends out of the interior space.

29. The communications apparatus according to claim 28 wherein removal of the lanyard activates the switch to turn the first wireless transmitter module on.

30. A communications apparatus for use with equipment worn by workers in dangerous environments wherein the equipment includes a face mask, comprising:
 a wireless transmitter operatively associated with the face mask;
 a transceiver capable of receiving signals from the transmitter and transmitting the received signals to other transceivers;
 a speaker associated with the transceiver so that signals broadcast from the transceiver may be audibly perceived; and
 an activation switch located entirely within the face mask associated with the transmitter, said activation switch including a lanyard attached to the switch wherein the lanyard extends beyond the periphery of the face mask.

31. A communications system for use by emergency workers defining a working group in a Wireless Personal Area Network (WPAN), comprising:
 for each worker in the WPAN, a face mask, and a short range transmitter operatively associated with said face mask so that communications from a worker wearing said face mask are transmitted to other workers in the working group, said short range transmitter including a microphone, a short range receiver and a speaker associated with the receiver;
 for at least one worker in the WPAN, a short range adaptor receiver operable to receive communications from said short range transmitters, said short range adaptor receiver having an output that may be selectively operated to communicate with a relatively longer range transmitter so that when said short range adaptor receiver is communicating with the relatively longer range transmitter, communications from said short range adaptor receiver are transmitted to said relatively longer range transmitter, said short range adaptor receiver operable to switch at least one workers short range adaptor receiver between first and second modes;
 wherein, in the first mode communications between workers in the WPAN are not broadcast from the longer range transmitter, and in the second mode, communications between workers in the WPAN are transmitted from the longer range transmitter.

32. The communications system according to claim 31 wherein in the first mode, communications from said relatively longer range transmitter are broadcast to workers in the WPAN only when there are no communications ongoing between workers in the WPAN.

* * * * *